Aug. 8, 1939   D. R. HILLIS   2,168,936
REVERSIBLE SINGLE-LINE FEEDER
Filed Oct. 17, 1936
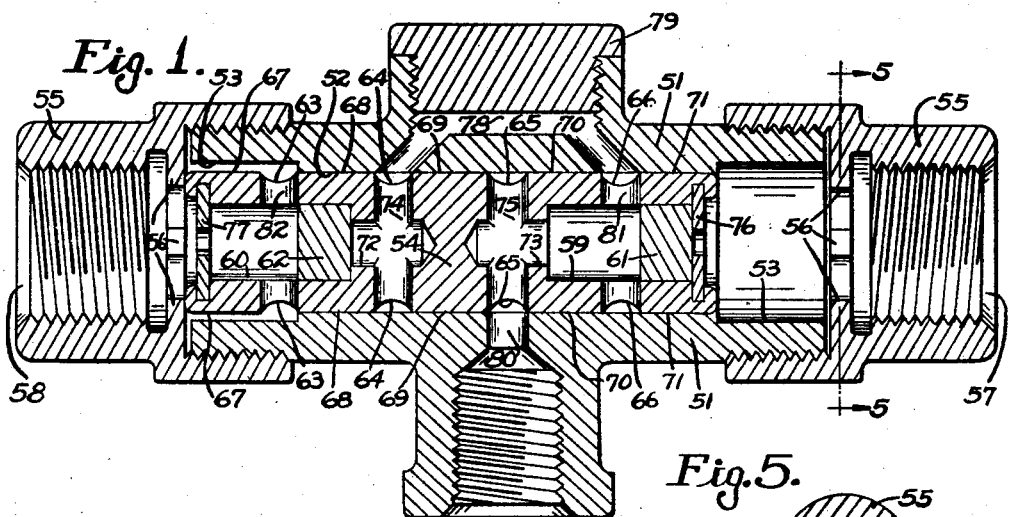
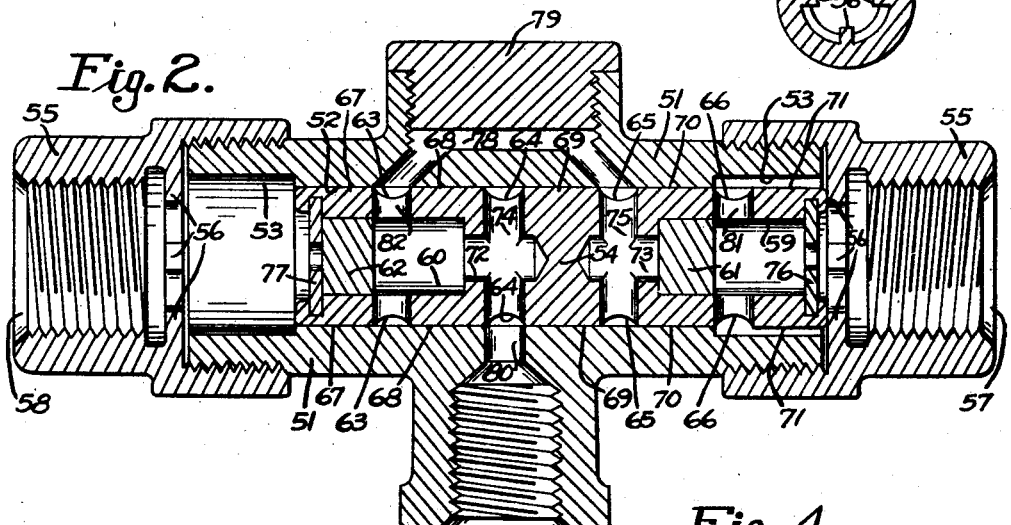
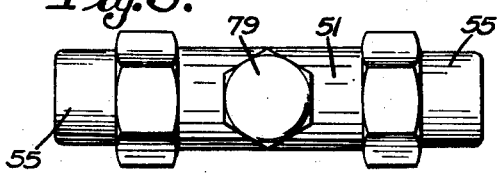
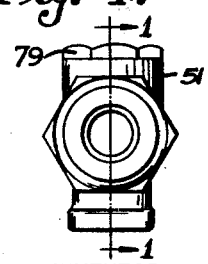
INVENTOR
David R. Hillis
BY
ATTORNEY Patented Aug. 8, 1939

2,168,936

UNITED STATES PATENT OFFICE 2,168,936

REVERSIBLE SINGLE-LINE FEEDER

David R. Hillis, Detroit, Mich., assignor to Trabon Engineering Corporation, Cleveland, Ohio, a corporation of Ohio Application October 17, 1936, Serial No. 106,167

11 Claims. (Cl. 184—7)

The present invention relates to improvements in feeders for a fluid distributing system especially adapted for handling lubricant, said system being of the single-line flow reversing type such as that described and claimed in my copending applications, Serial No. 523,149, filed March 16, 1931, now Patent Number 2,094,271, and Serial No. 738,656, filed August 6, 1934, now Patent Number 2,075,719.

Many feeders for this type of system have been developed by me, such for instance as those disclosed in my Patent No. 1,997,406 and in several of my copending applications and others filed simultaneously herewith. Prior feeders utilize a number of moving parts, are expensive to manufacture, and fail to respond properly to low pressure fluids of low viscosity, or when mounted in various positions, or when feeding small quantities of fluid into small bearings.

It is therefore an object of this invention to provide a feeder for such a system that has but few moving parts, is convenient to manufacture and service, and which has positive operating characteristics under all operating conditions.

These and other objects and advantages of the invention will appear from the following description, taken in conjunction with the accompanying drawing, in which:

Fig. 1 is a sectional view of my improved feeder taken on line 1—1 of Fig. 4;

Fig. 2 is a similar view to that shown in Fig. 1 with the operative parts shown in reverse position;

Fig. 3 is a top plan view thereof;

Fig. 4 is an end elevational view thereof; and

Fig. 5 is a sectional view on line 5—5 of Fig. 1.

Reference to these views in which like characters are employed to designate like parts throughout will now be made.

The feeder is made in substantially the shape of a cross, in order to permit easier manufacture but it could be made from a solid block of steel or other metal by boring the necessary passages and inserting suitable plugs to stop the ends of the respective passages in a manner well-known to those skilled in the art.

As shown, the feeder comprises a cross-shaped body member 51 having a cylindrical piston receiving orifice 52 bored through the longest portion of the cross. Each end of the cylindrical passage 52 is counterbored as at 53 to provide a passage or port around each end of a slidable piston or piston valve 54 that reciprocates in the cylindrical passage 52 upon the alternation of the flow of fluid through the feeder.

Each enlarged end of the piston guiding orifice 52 is provided with any suitable means for connecting it to a pipe line and with any suitable means for stopping the piston valve 54 in its appropriate place. For this purpose, I provide end fixtures comprising pierced caps 55 having spaced internally projecting stop lugs 56, which are shown more clearly in Fig. 5. When the peened edges of the end of the piston engage the stop lugs 56, the fluid passes freely therebetween. The caps may be secured to the ends of the body 51 in any suitable manner as by means of the screw threaded engagement shown. Either these end fixture caps or the ends of the cylindrical passages may be attached to a pipe line, in which latter event the pipe-line must be adapted to act as a stop member for the piston valve or may be provided with similar stop lugs.

Each of the pierced openings in the end fixtures acts as a dual-service port for the fluid distributing feeder. For convenience, I designate one of these dual-service ports by the numeral 57 and the other by the numeral 58.

The piston valve 54 is provided with two spaced cylindrical bores or chambers, one at each end thereof, in each of which an auxiliary piston is adapted to reciprocate. For convenience, I designate one of these chambers by the numeral 59 and the other by the numeral 60. Auxiliary piston 61 reciprocates in chamber 59 and auxiliary piston 62 reciprocates in chamber 60.

The exterior of piston valve 54 is provided with four substantially equally spaced circumferential grooves 63, 64, 65 and 66 respectively, thus leaving spaced valve heads or valve portions 67, 68, 69, 70 and 71. The grooves comprise ports in the piston and they are spaced apart by distances substantially equal to the stroke or reciprocation of the piston in the body.

A duct 72 is bored in piston valve 54 at the inner end of chamber 60 to permit fluid to flow out of said inner end of said chamber and a similar duct 73 is bored for the outlet of the inner end of chamber 59. Duct 72 may be bored at an angle to communicate directly with circumferential groove 64 but I prefer to bore a passage 74 diametrically through piston valve 54 from one side to the other of groove 64 and communicating with duct 72. Similarly, I provide a passage 75 passing from one side of piston valve 54 to the other in groove 65 and a duct 73 connecting axially therefrom to the other chamber 59 in the piston.

Any suitable means may be provided for preventing pistons 61 and 62 from sliding out of the outer ends of the chambers 59 and 60. For this purpose, I provide perforated disks 76 and 77 respectively each having a larger external diameter than that of the chambers 59 and 60. I counterbore the ends of piston valve 54 to receive the disks of larger diameter and then secure them in place by the impinging action of a hammer or other suitable means to peen the circumferential edge over in position to retain the disks in fixed relationship to the piston valve 54, as shown in Figs. 1 and 2.

The body portion 51 is also provided with a communicating passageway or by-pass loop 78, the respective ends of which open into ports spaced axially along the walls of the orifice 52 and adapted to register with circumferential grooves 64 or 66, when piston valve 54 is in the position shown in Fig. 1, and adapted to register with circumferential grooves 63 and 65 when said piston valve 54 is in the position shown in Fig. 2. I prefer to accomplish the boring of this passageway 78 by boring one arm of the cross of the body member to a suitable depth and then boring diagonally to the desired locations as shown. I then secure a plug 79 in the bored arm of the cross, as by the screw threaded means shown, as to have a passageway between the inner portion of the plug and the innermost end of the large bore in said arm as shown.

In the other arm of the cross, I bore an outlet or discharge port 80 and provide it with suitable means for connection to a pipe line or bearing or other suitable receptacle. This outlet port 80 is adapted to register with circumferential groove 65 when piston valve 54 is in the position shown in Fig. 1, and with circumferential groove 64 when said piston valve is in the position shown in Fig. 2. Grooves 64 and 65 thus serve as piston discharge ports.

The middle portion of chamber 59 is provided with a by-pass port 81 which may pass diametrically through the piston valve 54 as shown. It communicates with the circumferential groove 66. Similarly the middle portion of cylinder 60 is provided with a by-pass port 82 which may pass diametrically through the valve 54 as shown and it communicates with circumferential groove 63.

The operation of this device is as follows: Assume that fluid under pressure is flowing into the feeder through port 57. Let it be also assumed that piston valve 54 is in the position shown in Fig. 2 and pistons 61 and 62 occupy the positions in chambers 59 and 60 as shown in Fig. 1. The fluid under pressure will then cause piston valve 54 to shift to the position shown in Fig. 1 after which it will move piston 61 to the left, causing it to discharge a measured quantity of fluid from chamber 59, out through duct 73 and passage 75 into circumferential groove 65 and out of outlet port 80. The fluid continuing to enter chamber 59 will then pass out thereof through by-pass port 81 into the circumferential groove 66 and thence through by-pass loop 78 into circumferential groove 64, thence through passage 74 and duct 72 into chamber 60, causing piston 62 to move to the left, thence through passage 82, which then registers with one of the counterbored portions 53 at the end of the piston guiding orifice 52, and thence passes between the stop lugs 56 and through dual-service port 58.

On reversal of flow of fluid under pressure, it will enter the feeder through port 58, shift the parts to the position shown in Fig. 2, then cause piston 62 to move to the right, thus discharging a measured quantity of fluid out of the chamber 60 through duct 72, passage 74, groove 64 and discharge port 80. The continued flow of the fluid will by-pass through the feeder from chamber 60 through port 82, groove 63, passage 78, groove 66, passage 75, duct 73 into chamber 59 moving piston 61 to the right, thence out of passage 81 to groove 66 which then communicates with the other counterbored portion 53 and thence between the spaced stop lugs 56 and out of dual-service port 57. The counter-bored portions 53 at opposite ends of the piston guiding orifice 52 thus comprise ports for connection with the ports 81 and 82 in the side walls of the respective chambers 59 and 60.

It will be seen that I have provided a fluid distributing feeder which has positive operating characteristics for feeding small quantities of fluid at high or low pressures and in any mounted position, which comprises a minimum number of moving parts requiring a minimum of close fitting guides or bores, and which is conveniently assembled and readily accessible for servicing.

Although I have shown and described a specific embodiment of my invention, I am fully aware that many modifications thereof are possible. Therefore, I do not wish to be restricted to the specific structural details, arrangement of parts or connections herein set forth, as various modifications thereof may be effected without departing from the spirit and scope of my invention.

I claim:

1. In a fluid distributing feeder the combination with a body having a discharge port and two service ports, of means in said body responsive to the injection of fluid into either service port for discharging a quantity of fluid from the discharge port and thereafter passing the injected fluid out of the other one of said service ports, said means comprising a ported piston receiving orifice in said body, a single outlet port in the side of said orifice connected to the body discharge port, a hollow ported piston slidable in said orifice, a pair of chambers in said piston opening through respective spaced piston discharge ports whereby the chambers are selectively connected for discharging into said outlet port, and an auxiliary piston slidably disposed in each of said chambers.

2. In a fluid distributing feeder the combination of a body having a piston guiding orifice therein, a discharge port in the side wall of said orifice, a hollow piston slidably disposed in said orifice, fluid receiving passages in said piston, a plurality of cylinders in said hollow piston, an auxiliary fluid propelling piston in each cylinder in said hollow piston, and a plurality of discharge ports disposed in said piston for selective connection with the discharge port in said orifice as the piston reciprocates therein.

3. In a fluid distributing feeder the combination of a body having a piston guiding orifice therein, a discharge port in the side wall of said orifice, a hollow piston slidably disposed in said orifice, end fixtures on said body at opposite ends of said orifice for defining fluid receiving compartments and comprising stop means for determining the extreme positions of said piston, fluid receiving passages in said hollow piston for receiving fluid from said compartments, a plurality of cylinders in said hollow piston, an auxiliary fluid propelling piston in each cylinder in said hollow piston, and two discharge ports disposed in said piston for selectively connecting with the discharge port in said orifice as the piston is moved axially to either of its extreme positions.

4. In a fluid distributing feeder the combination of a body having a piston guiding orifice therein, a discharge port in the side wall of said orifice, a hollow piston slidably disposed in said orifice, end fixtures on said body at opposite ends of said orifice for defining fluid receiving compartments and comprising stop means for determining the extreme positions of said piston, two discharge ports disposed in said piston for selective connection with said discharge port in the side wall of said orifice as the piston is moved axially to either of its extreme positions, inlet passages connecting into said hollow piston from said compartments, and auxiliary pistons, each slidably disposed in said hollow piston and discharging a quantity of fluid from said piston through one of said discharge ports as it is moved toward the other auxiliary piston by fluid pressure, said fluid pressure being alternatively applied in said compartments.

5. In a fluid distributing feeder the combination of a body having a piston guiding orifice therein, a hollow ported piston slidably disposed in said orifice, said piston having a partition in its body part, dual-service ports at opposite ends of said orifice, inlet ports in opposite ends of said piston, two piston discharge ports spaced axially in said piston, a discharge port in said body for selective connection with either one of said piston discharge ports alternatively as the piston reciprocates to either of two extreme positions responsive to the application of fluid pressure to either of said dual-service ports, and fluid actuated members associated with said piston and separated by said partition, each such member discharging a quantity of fluid from its associated piston discharge port when said port is connected to the body discharge port and the application of fluid pressure is continued.

6. In a fluid distributing feeder the combination of a body having a piston guiding orifice, a body discharge port in said orifice, a dual-service port at each end of said orifice, a piston slidable in said orifice responsive to fluid pressures applied through either dual-service port, a chamber in each end of said piston, an inlet port in the outermost end of each chamber, a chamber by-pass port in the side of each chamber, a by-pass port in each end of the body for connection from each dual-service port to each chamber by-pass port when the piston is moved to its adjacent position, piston discharge ports opening from said chambers respectively and spaced axially in said piston for selective connection with said body discharge port, a by-pass loop in said body opening at opposite ends through by-pass ports spaced axially in said orifice for reversible selective connection between the chamber by-pass port at one end of the piston and the piston discharge port at the other end of the piston as the piston is actuated between two positions, an auxiliary piston slidable in each chamber responsive to fluid pressure applied to the adjacent dual-service port for discharging fluid through the ports connecting from said chamber and thereafter opening the inlet port to the by-pass port in said chamber, for by-passing fluid through said by-pass loop to push the auxiliary piston to the outermost end of the other chamber, to charge the chamber and to by-pass the fluid through its associated by-pass port and thence through the associated dual-service port.

7. In a fluid distributing feeder the combination of a body having a piston guiding orifice, an enlarged counterbore at each end of said piston guiding orifice, a body discharge port in said orifice, a dual-service port at each end of said orifice, a piston slidable in said orifice responsive to fluid pressures applied through either dual-service port, a chamber in each end of said piston, an inlet port in the outermost end of each chamber, a by-pass port in the side of each chamber disposed for closure by movement into close engagement with the side walls of the orifice or for opening into the enlarged counter-bore as the piston is actuated between two extreme positions in the orifice, piston discharge ports opening from said chambers respectively and spaced axially in said piston for selective connection with said body discharge port, a by-pass loop in said body opening at opposite ends through by-pass ports spaced axially in said orifice for reversible selective connection between one of said chamber by-pass ports and one of said piston discharge ports as the piston is actuated between two positions, an auxiliary piston slidable in each chamber responsive to fluid pressure applied to the adjacent dual-service port for discharging fluid through the ports connecting from said chamber and thereafter opening the inlet port to the by-pass port in said chamber for by-passing fluid through said by-pass loop to push the other auxiliary piston to the outermost end of the other chamber, to charge said other chamber and to by-pass the fluid through the associated by-pass port and thence through the associated dual-service port.

8. In a fluid distributing feeder the combination of a body having a piston guiding orifice, an enlarged counterbore at each end of said piston guiding orifice, a body discharge port in said orifice, end fixtures on said body providing a dual-service port at each end of said orifice, open fluid passing piston stop means in each end fixture, a piston slidable in said orifice responsive to fluid pressures applied through either dual-service port, a chamber in each end of said piston, an inlet port in the outermost end of each chamber, a by-pass port in the side of each chamber disposed for closure by movement into close engagement with the side walls of the orifice or for opening into the enlarged counterbore as the piston is actuated to carry either chamber into the piston guiding orifice or into the counter-bore respectively, piston discharge ports opening from said chambers respectively and spaced axially in said piston for selective connection with said body discharge port, a by-pass loop in said body opening at opposite ends through by-pass ports spaced axially in said orifice for reversible selective connection between one of said chamber by-pass ports and one of said piston discharge ports as the piston is actuated to one of its extreme positions and for reversing the connections when the piston is moved to its other position, an auxiliary piston slidable in each chamber responsive to fluid pressure applied to the adjacent dual-service port for discharging fluid through the ports connecting from said chamber and thereafter opening the inlet port to the by-pass port in said chamber, in said body said discharge port being so positioned that it is spaced between the orifice by-pass ports of said by-pass loop, and in the piston, the two discharge ports being disposed in the intermediate portion spaced between the by-pass ports from said chamber.

9. In a fluid distributing feeder the combination of a body having a piston guiding orifice, a body discharge port in said orifice, a dual-service port at each end of said orifice, means responsive to fluid pressure applied to either dual-service port for discharging a predetermined quantity of fluid from said body discharge port and for thereafter by-passing fluid through the other dual-service port including, a piston slidable in said orifice, a chamber in each end of said piston, an inlet port in the outermost end of each chamber, a movable pressure actuated member separately disposed in each chamber, and interconnecting means actuated by the movement of the piston in said orifice.

10. In a fluid distributing feeder the combination of a body having a piston guiding orifice therein, a partitioned and ported piston slidably disposed in said orifice, said piston having two cylinders, one on each side of the piston partition, dual-service ports at opposite ends of said orifice, inlet ports in opposite ends of said piston, each leading to one of the cylinders in said piston, a discharge port in said body, a movable member in each piston cylinder, each of said members being actuated by the application of fluid pressure entering its cylinder from its adjacent dual-service port and adapted to co-operate with ports in said piston for discharging a previously charged quantity of fluid from the discharge port and conduit means controlled by said piston and fluid pressure for by-passing the received fluid to the other dual-service port after the fluid pressure discharges a quantity of fluid from the discharge port by operation of the piston in either direction.

11. In a fluid distributing feeder the combination of a body having a piston guiding orifice therein, an outlet port communicating with said orifice and disposed centrally of said body and dual-service ports disposed in end portions of said body and communicating with said orifice, a partitioned piston having two hollow ends, said piston being slidably disposed in said orifice, stop means limiting the slidable movement of said piston, two additional ports in said body communicating with and spaced axially along said orifice, one on each side of said outlet port, said two additional ports being connected by a by-pass passage, all five of said body ports communicating with the orifice at points spaced at distances equal to the stroke of the piston, four piston ports spaced axially along said piston, said four ports being spaced at distances equal to the stroke of the piston and a fluid ejecting means movably disposed in each hollow end portion of said piston.

DAVID R. HILLIS.